United States Patent
Huang et al.

(10) Patent No.: US 7,899,250 B2
(45) Date of Patent: Mar. 1, 2011

(54) METHOD AND DISPLAY SYSTEM CAPABLE OF DETECTING A SCOREBOARD IN A PROGRAM

(75) Inventors: Chen-Hsiu Huang, Chi-Lung (TW); Yueh-Hsuan Chiang, Taipei (TW); Ho-Chao Huang, Taipei (TW)

(73) Assignee: CyberLink Corp., Hsin-Tien, Taipei Hsien (TW)

( * ) Notice: Subject to any disclaimer, the term of this patent is extended or adjusted under 35 U.S.C. 154(b) by 985 days.

(21) Appl. No.: 11/737,744

(22) Filed: Apr. 19, 2007

(65) Prior Publication Data

US 2008/0130997 A1 Jun. 5, 2008

(30) Foreign Application Priority Data

Dec. 1, 2006 (TW) .............................. 95144757 A (51) Int. Cl.
*G06K 9/34* (2006.01)
(52) U.S. Cl. ..................................................... 382/176
(58) Field of Classification Search ......... 382/173–180, 382/282–283, 181–189, 100, 190; 715/723–725; 725/135; 348/699–700, 231.1–231.2; 375/240.01–240.29
See application file for complete search history.

(56) References Cited

U.S. PATENT DOCUMENTS

| | | | |
|---|---|---|---|
| 7,143,354 B2* | 11/2006 | Li et al. | 715/725 |
| 2004/0125877 A1* | 7/2004 | Chang et al. | 375/240.28 |
| 2006/0075454 A1* | 4/2006 | Jung et al. | 725/135 |
| 2007/0291134 A1* | 12/2007 | Hwang et al. | 348/231.2 |
| 2009/0060342 A1* | 3/2009 | Chiang et al. | 382/190 |

OTHER PUBLICATIONS

Chiung Sheng Wu, Automatic Scoreboard Recognition and Recording for Baseball Games in Videos, Jun. 2004, pp. 15, 18, 19, 29~32, 37~39, fig.4.17, 4.24, National Taipei University of Technology.

* cited by examiner

*Primary Examiner*—Sherali Ishrat
(74) *Attorney, Agent, or Firm*—Winston Hsu; Scott Margo (57) ABSTRACT

A method capable of detecting a scoreboard in a program includes detecting a region which displays static images in a program having a plurality of frames, identifying the text contents of the region, and determining whether the variation in the text contents is larger than a predetermined value and occurs conforming to a predetermined rule. If the variation in the text contents is larger than the predetermined value and occurs conforming to the predetermined rule, the method signifies that the region displays the static images corresponding to a scoreboard.

19 Claims, 12 Drawing Sheets

METHOD AND DISPLAY SYSTEM CAPABLE OF DETECTING A SCOREBOARD IN A PROGRAM

BACKGROUND OF THE INVENTION

1. Field of the Invention

The present invention related to a method and a display system capable of detecting a scoreboard in a program, and more particularly, to a method and a display system capable of detecting a scoreboard in a program based on the amount and rule of variations in text contents.

2. Description of the Prior Art

With rapid development in consumer electronic products, video entertainment products have become essential in daily life. For television sets widely available in household, only wireless television stations providing limited amounts of channels were available in the past. As technology progresses, cable televisions can offer consumers more than a hundred channels. Recently, digital televisions are gaining more and more attention due to superior display quality and a variety of powerful functions, such as time-shifting, play/pause, stop, forward/backward, fast forward/fast backward, etc.

In most sport programs, a scoreboard is constantly displayed on the screen so that the audience can be informed of current game status. Meanwhile, different channels display respective channel logos (such as "CNN", "ESPN", "HBO" or "DISCOVERY CHANNEL") on specific locations of the screen (such as on the screen corners). In most applications, it is often required to detect images of the scoreboard in a program for subsequent analyses.

SUMMARY OF THE INVENTION

The present invention provides a method capable of detecting a scoreboard in a program comprising detecting a region which displays static images in a program having a plurality of frames; identifying text contents in the region; determining whether a variation in the text contents is larger than a first predetermined value; and signifying that the region displays the static images regarding a scoreboard when the variation in the text contents is larger than the first predetermined value.

The present invention provides a display system capable of detecting a scoreboard in a program comprising a detecting means capable of detecting a region which displays static images in a program having a plurality of frames; an identifying means capable of identifying text contents in the region; and a judging means capable of determining whether a variation in the text contents is larger than a predetermined value and occurs conforming to a predetermined rule, the judging means capable of signifying that the region displays the static images regarding a scoreboard when the variation in the text contents is larger than the predetermined value and occurs conforming to the predetermined rule.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
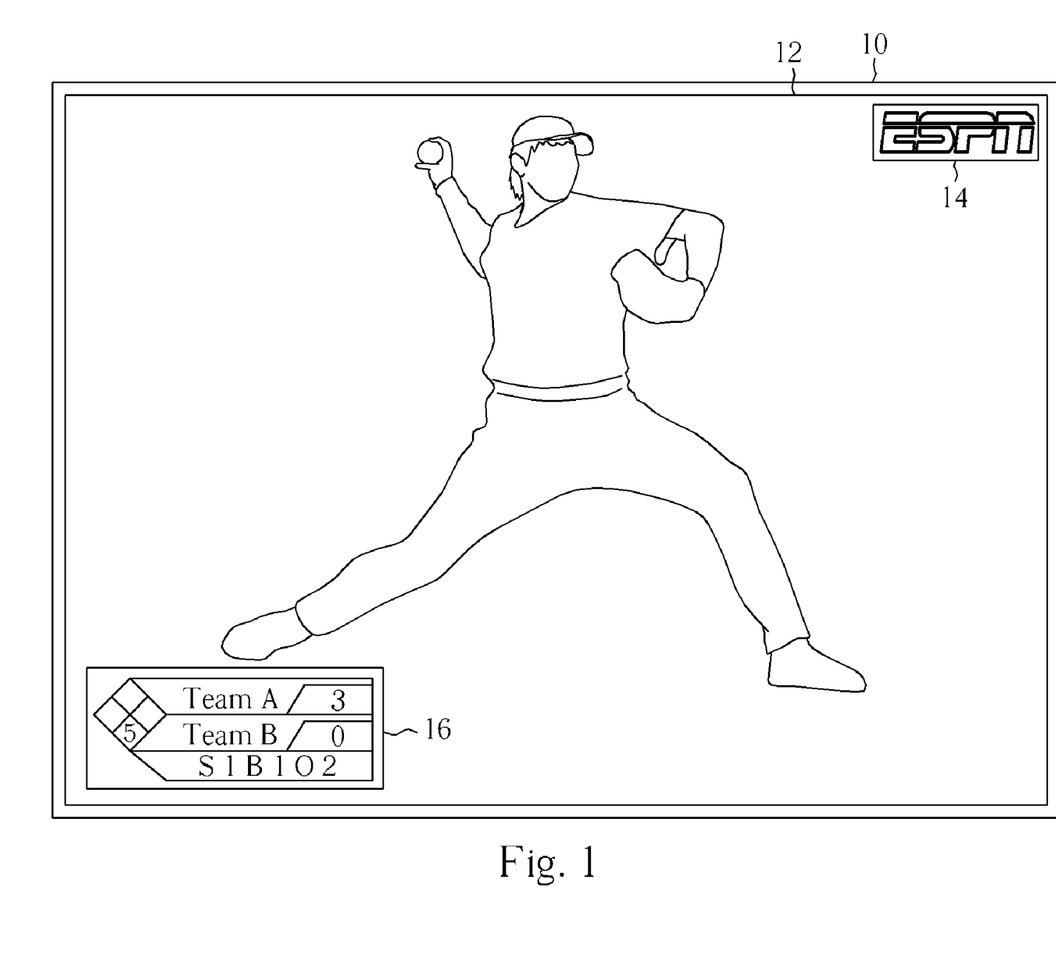
FIG. 1 is a diagram of a video display device when displaying a sport program according to the present invention.

Reference is made to FIG. 1 for a diagram of a video display device 10 when displaying a sport program 12 according to the present invention. In addition to dynamic images regarding the main contents of the sport program 12, the video display device 10 (such as a TV set or a computer screen) also displays a channel logo 14 and a scoreboard 16. In the embodiment shown in FIG. 1, the sport program 12 is a baseball game; the channel logo 14 may include "ESPN", "EuroSport" or "FOX" representing certain sport channels ("ESPN" is depicted in FIG. 1 as an example); the scoreboard 16 may include numbers (such as "3" and "0" representing the score of the baseball game, "1" representing the number of pitches called as strike, "1" representing the number of pitches called as ball, "2" representing the number of players declared out in an inning, and "5" representing the current inning) and symbols (such as "S" representing strikes, "B" representing balls, "O " representing outs, "Team A" and "Team B" representing the names of the teams, and the diamond shape pattern similar to a baseball field representing current runner-on-base).

Compared to dynamic images regarding the main contents of the sport program 12, the channel logo 14 and the scoreboard 16 are static images with little variations when displayed on the screen. Since static images may also include some dynamic images, a static image may not be completely stationary. In other words, an image can be viewed as a static image as long as the pattern of the image shows no apparent variations within a period of time, or shows periodic variations (the amount and period of variation within the period of time can be pre-defined by the user, or can be equivalently defined as image parameters). For example, static images may include texts or symbols which only vary according to certain rules. For example, the channel logo 14 in FIG. 1 can be a completely stationary "ESPN", or can include dynamic visual effects such as swiveling or blinking. Therefore, compared to the main program contents which are completely dynamic, the channel logo 14 includes relatively static images. A static image may also vary sporadically as the program progresses. For example, when the sport program 12 is a baseball game, the text contents of the scoreboard 16 vary as the numbers of pitches, runs, innings or runners-on-base change. However, compared to the completely dynamic main program contents, the scoreboard 16 displays relatively static images.

The video display device 10 displays the sport program 12 by continuously displaying a plurality of frames. The dynamic images regarding the main contents of the sport program 12 and the static images corresponding to the channel logo 14 and the scoreboard 16 have different characteristics. Based on the differences between the dynamic images and the statistic images, the present invention detects regions which display static images in a program. Based on the characteristic differences between the channel logo 14 and the scoreboard 16, the present invention determines whether a detected region displays static images regarding the scoreboard 16.

First, methods for detecting regions which display static images in a program are illustrated. The present invention can detect regions which display static images in a program by means of pixel-based accumulation. For the dynamic images regarding the main contents of the sport program 12, a random signal is obtained by accumulating the pixel value of each frame at the same location over a long period of time. However, for the static images regarding the channel logo 14 and the scoreboard 16, the pixel value of each frame at the same location does not largely vary with time. Therefore, after performing pixel-based accumulation on the sport program 12 for a predetermined period of time, a pixel-based accumulation diagram can be obtained in which regions displaying dynamic images have a higher brightness and regions displaying static images have a lower brightness. Next, by performing image inversion on the pixel-based accumulation diagram, a resultant inverted pixel-based accumulation diagram can be obtained in which regions displaying dynamic images have a lower brightness and regions displaying static images have a higher brightness.

Figure 2:
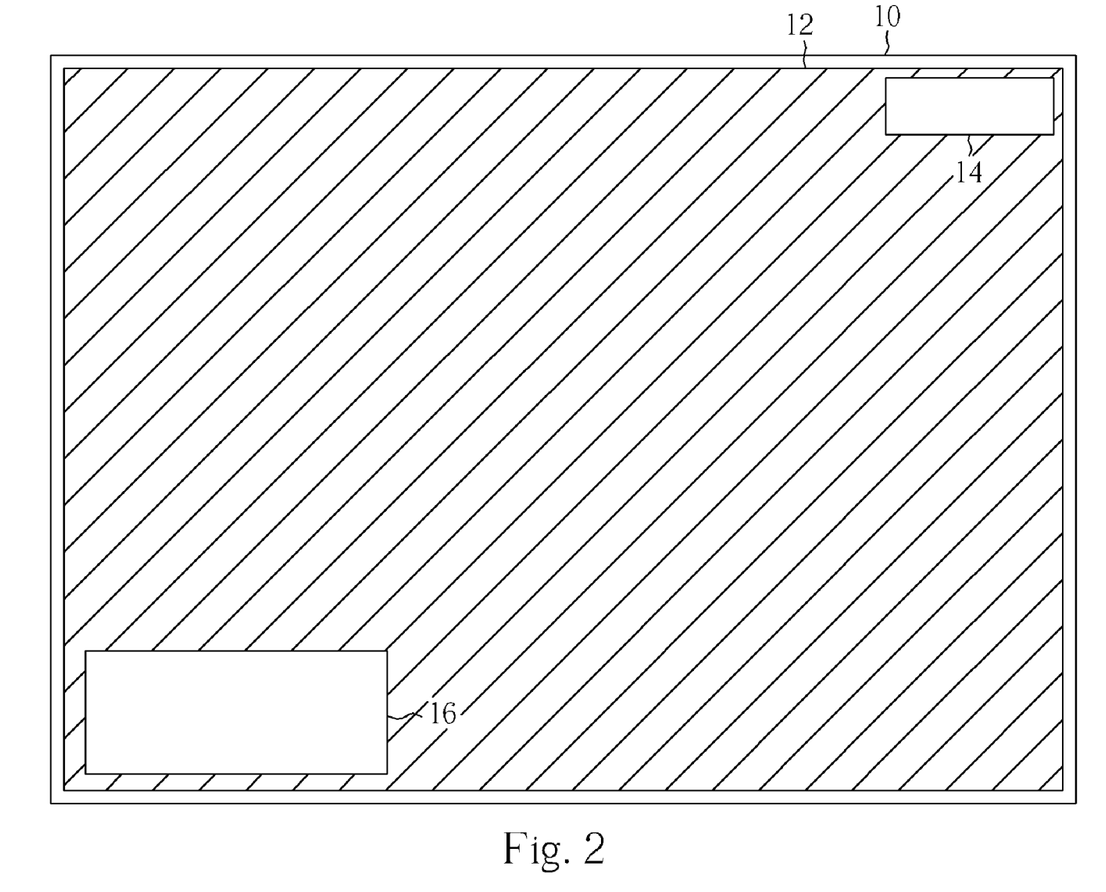
FIG. 2 is a signal diagram after performing pixel-based accumulation and image inversion on the sport program.

Reference is made to FIG. 2 for a signal diagram after performing pixel-based accumulation and image inversion on the sport program 12. In the signal diagram in FIG. 2, slanted areas represent regions of a lower brightness, while blank areas represent regions of a higher brightness. In other word, slanted areas correspond to the display regions of the main contents of the sport program 12 (dynamic images), while blank areas correspond to the display regions of the channel logo 14 and the scoreboard 16 of the sport program 12 (static images).

Figure 3:
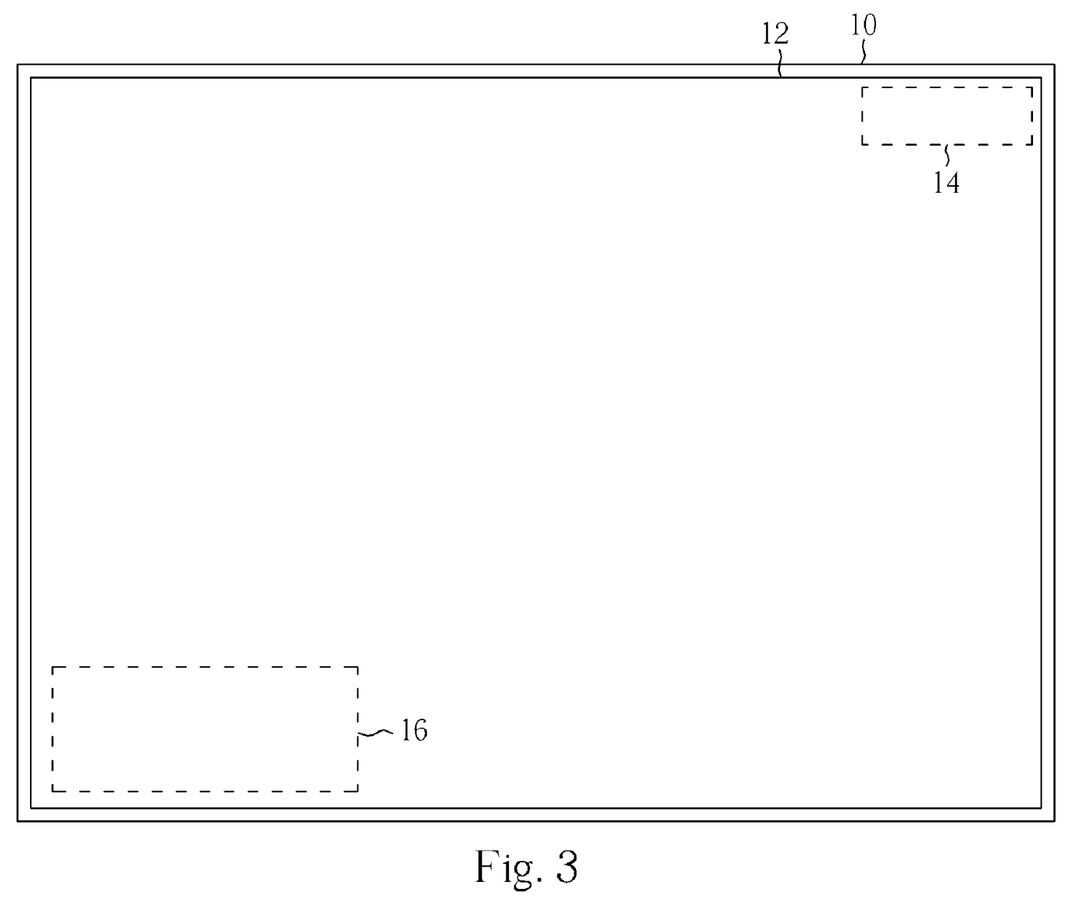
FIG. 3 is a signal diagram after performing edge pixel accumulation on the sport program.

Also, the present invention can detect regions which display static images in a program by means of edge pixel accumulation. For the dynamic images regarding the main contents of the sport program 12, a random signal is obtained by accumulating edge pixel value of each frame over a predetermined period of time. However, in the static images regarding the channel logo 14 and the scoreboard 16, edge pixel values do not largely vary with time. Therefore, after performing edge pixel accumulation on the sport program 12 for a predetermined period of time, an edge pixel accumulation diagram can be obtained in which regions displaying dynamic images have lower accumulated edge pixel values and regions displaying static images have higher accumulated edge pixel values. Since detected edge pixels shows a certain degree of connectivity, horizontal and vertical projecting methods can be used for marking regions having high accumulated edge pixel values. The marked regions thus correspond to the number and range of statistic images in the sport program 12. Reference is made to FIG. 3 for a signal diagram after performing edge pixel accumulation on the sport program 12. In the signal diagram in FIG. 3, dotted lines mark the regions of high accumulated edge pixel values and correspond to the outlines of the channel logo 14 and the scoreboard 16 of the sport program 12 (static images).

After obtaining the regions which display static images in the sport program 12, the present invention performs rule-based text change analysis for determining whether the detected regions display static images regarding the channel logo 14 or the scoreboard 16. In rule-based text change analysis, the present invention identifies the text contents of a detected region which display static images, and determines the amount and regularity of variations in the text contents. Normally speaking, the text contents of a scoreboard vary a lot, while the text contents of a channel logo vary little or do not vary at all. Meanwhile, the text contents of a scoreboard and a channel logo vary in different ways. Based on the type of a sport program, the amount and regularity of variations in the text contents of the sport program are also different. For example, in the scoreboard 16 of a baseball game, the numbers representing "strikes" and "outs" vary between 0 and 2, the number representing "balls" varies between 0 and 3, and the number representing "innings" usually varies between 0 and 9 as the baseball game progresses. In other words, the text contents of the scoreboard 16 vary according to a specific rule. Under most circumstances, the channel logo 14 only includes stationary texts which do not vary with the baseball game. Even if the channel logo 14 includes dynamic visual effects such as swiveling or blinking, the text contents of the channel logo 14 vary in a more simple and regular way.

Figure 4:
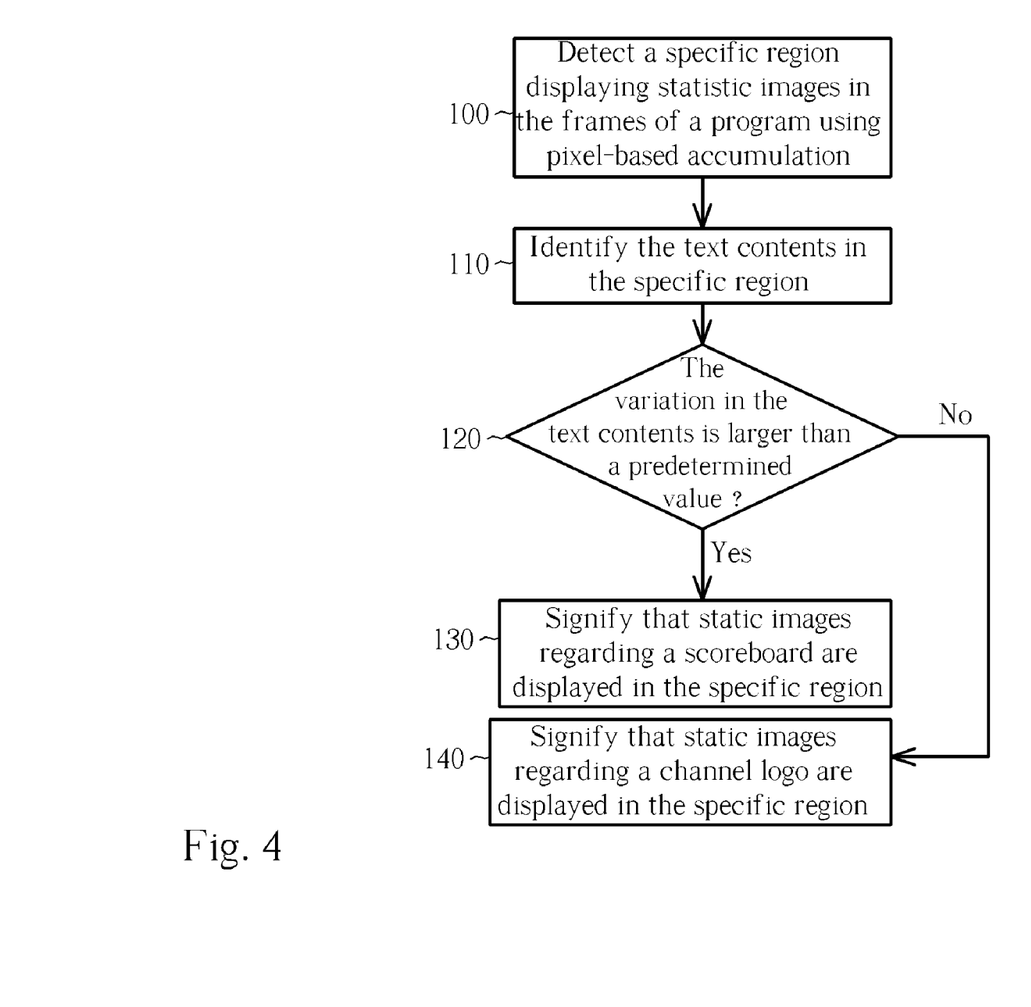
FIG. 4 is a flowchart illustrating a method of detecting a scoreboard in a program according to a first embodiment of the present invention.

Reference is made to FIG. 4 for a flowchart illustrating a method of detecting a scoreboard in a program according to a first embodiment of the present invention. The flowchart in FIG. 4 includes the following steps:

Step 100: detect a specific region which displays statistic images in the frames of a program by means of pixel-based accumulation.

Step 110: identify the text contents in the specific region.

Step 120: determine whether the variation in the text contents within a predetermined period of time is larger than a predetermined value; if the variation in the text contents is larger than the predetermined value, execute step 130; if the variation in the text contents is not larger than the predetermined value, execute step 140.

Step 130: signify that static images regarding a scoreboard are displayed in the specific region.

Step 140: signify that static images regarding a channel logo are displayed in the specific region.

In the first embodiment of the present invention, step 100 is first executed for detecting a specific region which displays statistic images by means of pixel-based accumulation. Next, step 110 is executed for identifying the text contents in the specific region, and step 120 is executed for determining whether the variation in the text contents is larger than a predetermined value. If the statistic images correspond to a scoreboard, the text contents have significant variations within the predetermined period of time. In this case, step 130 is executed in the first embodiment of the present invention for signifying that static images regarding a scoreboard are displayed in the specific region. If the statistic images correspond to a channel, the text contents have insignificant variations within the predetermined period of time. In this case, step 140 is executed in the first embodiment of the present invention for signifying that static images regarding a channel logo are displayed in the specific region.

Figure 5:
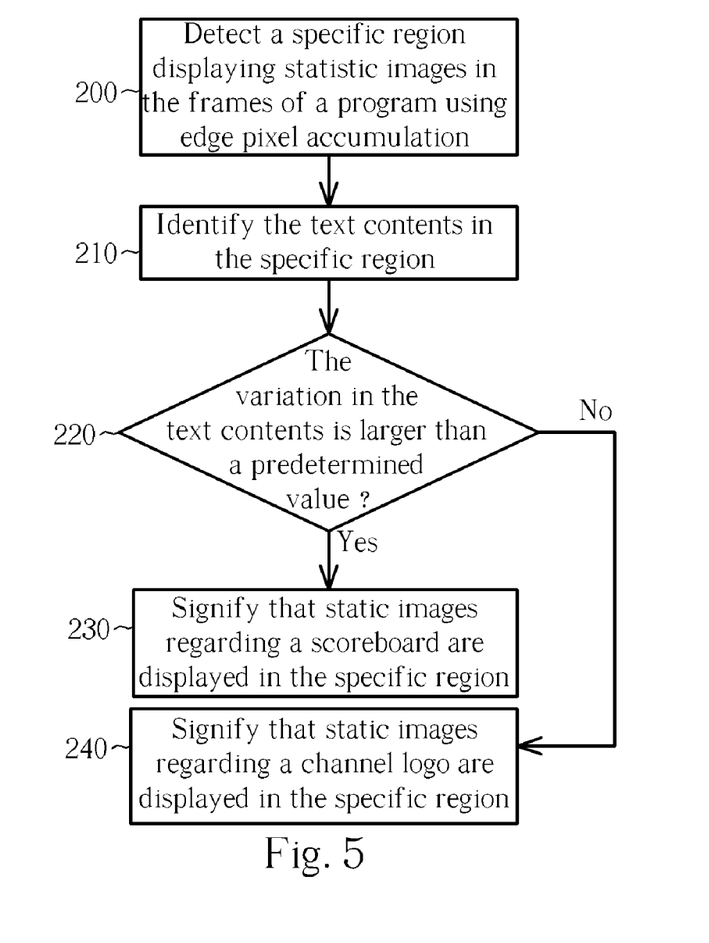
FIG. 5 is a flowchart illustrating a method of detecting a scoreboard in a program according to a second embodiment of the present invention.

Reference is made to FIG. 5 for a flowchart illustrating a method of detecting a scoreboard in a program according to a second embodiment of the present invention. The flowchart in FIG. 5 includes the following steps:

Step 200: detect a specific region which displays statistic images in the frames of a program by means of edge pixel accumulation.

Step 210: identify the text contents in the specific region.

Step 220: determine whether the variation in the text contents within a predetermined period of time is larger than a predetermined value; if the variation in the text contents is larger than the predetermined value, execute step 230; if the variation in the text contents is not larger than the predetermined value, execute step 240.

Step 230: signify that static images regarding a scoreboard are displayed in the specific region.

Step 240: signify that static images regarding a channel logo are displayed in the specific region.

The second embodiment is similar to the first embodiment of the present invention. However, in the second embodiment of the present invention, step 200 is first executed for detecting a specific region which displays statistic images by means of edge pixel accumulation. Next, step 210 is executed for identifying the text contents in the specific region, and step 220 is executed for determining whether the variation in the text contents is larger than a predetermined value. If the statistic images correspond to a scoreboard, the text contents have significant variations within the predetermined period of time. In this case, step 230 is executed in the second embodiment of the present invention for signifying that static images regarding a scoreboard are displayed in the specific region. If the statistic images correspond to a channel, the text contents have insignificant variations within the predetermined period of time. In this case, step 240 is executed in the second embodiment of the present invention for signifying that static images regarding a channel logo are displayed in the specific region.

Figure 6:
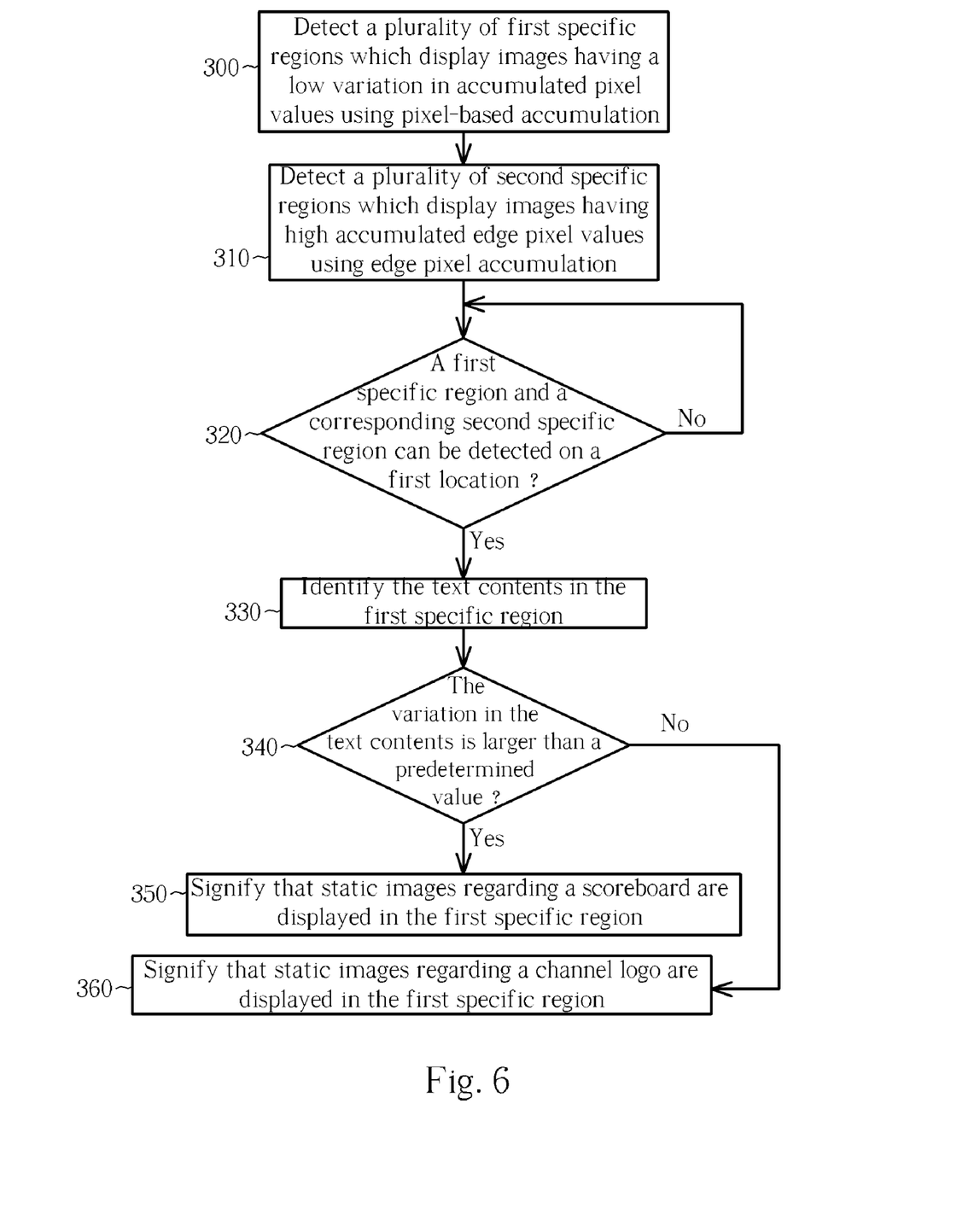
FIG. 6 is a flowchart illustrating a method of detecting a scoreboard in a program according to a third embodiment of the present invention.

Reference is made to FIG. 6 for a flowchart illustrating a method of detecting a scoreboard in a program according to a third embodiment of the present invention. The flowchart in FIG. 6 includes the following steps:

Step 300: detect a plurality of first specific regions which display images having a low variation in accumulated pixel values in the frames of a program by means of pixel-based accumulation.

Step 310: detect a plurality of second specific regions which display images having high accumulated edge pixel values in the frames of the program by means of edge pixel accumulation.

Step 320: based on a first specific region detected on a first location of the frames of the program, determine whether a corresponding second specific region can be detected on the first location; if the corresponding second specific region can be detected on the first location, execute step 330; if the corresponding second specific region cannot be detected on the first location, execute step 320.

Step 330: identify the text contents in the first specific region.

Step 340: determine whether the variation in the text contents within a predetermined period of time is larger than a predetermined value; if the variation in the text contents is larger than the predetermined value, execute step 350; if the variation in the text contents is not larger than the predetermined value, execute step 360.

Step 350: signify that static images regarding a scoreboard are displayed in the first specific region.

Step 360: signify that static images regarding a channel logo are displayed in the first specific region.

In the third embodiment of the present invention, regions displaying statistic images are detected by means of both pixel-base accumulation and edge pixel accumulation. First, a plurality of first specific regions which display images having a low variation in accumulated pixel values are detected by means of pixel-based accumulation in step 300. Next, a plurality of second specific regions which display images having high accumulated edge pixel values are detected by means of edge pixel accumulation in step 310. Among the plurality of first specific regions detected in step 300, a first specific region may have a low variation in accumulated pixel values as a result of displaying statistic images or dynamic images having a low variation. Similarly, among the plurality of second specific regions detected in step 310, a second specific region may have high accumulated edge pixel values as a result of displaying statistic images or displaying the outline of a stationary object in dynamic images over a long period of time. In order to achieve better accuracy, step 320 is executed in the third embodiment of the present invention for determining whether the corresponding first and second specific regions can both be detected on the same location by means of both pixel-base accumulation and edge pixel accumulation. If only the first specific region can be detected on the first location, the first specific region is not signified as a region displaying statistic images. If both the first and second specific region can be detected on the first location respectively by means of pixel-base accumulation and edge pixel accumulation, the first specific region is signified as a region displaying statistic images, and subsequent steps for identifying/determining text contents are executed. In other words, in addition to detecting the plurality of first specific regions which are likely to display statistic images by means of pixel-based accumulation, the plurality of second specific regions detected by means of edge pixel accumulation in step 310 are used to determine whether each of the first specific region actually displays static images. As a result, the third embodiment of the present invention is capable of detecting regions which display static images more accurately.

Figure 7:
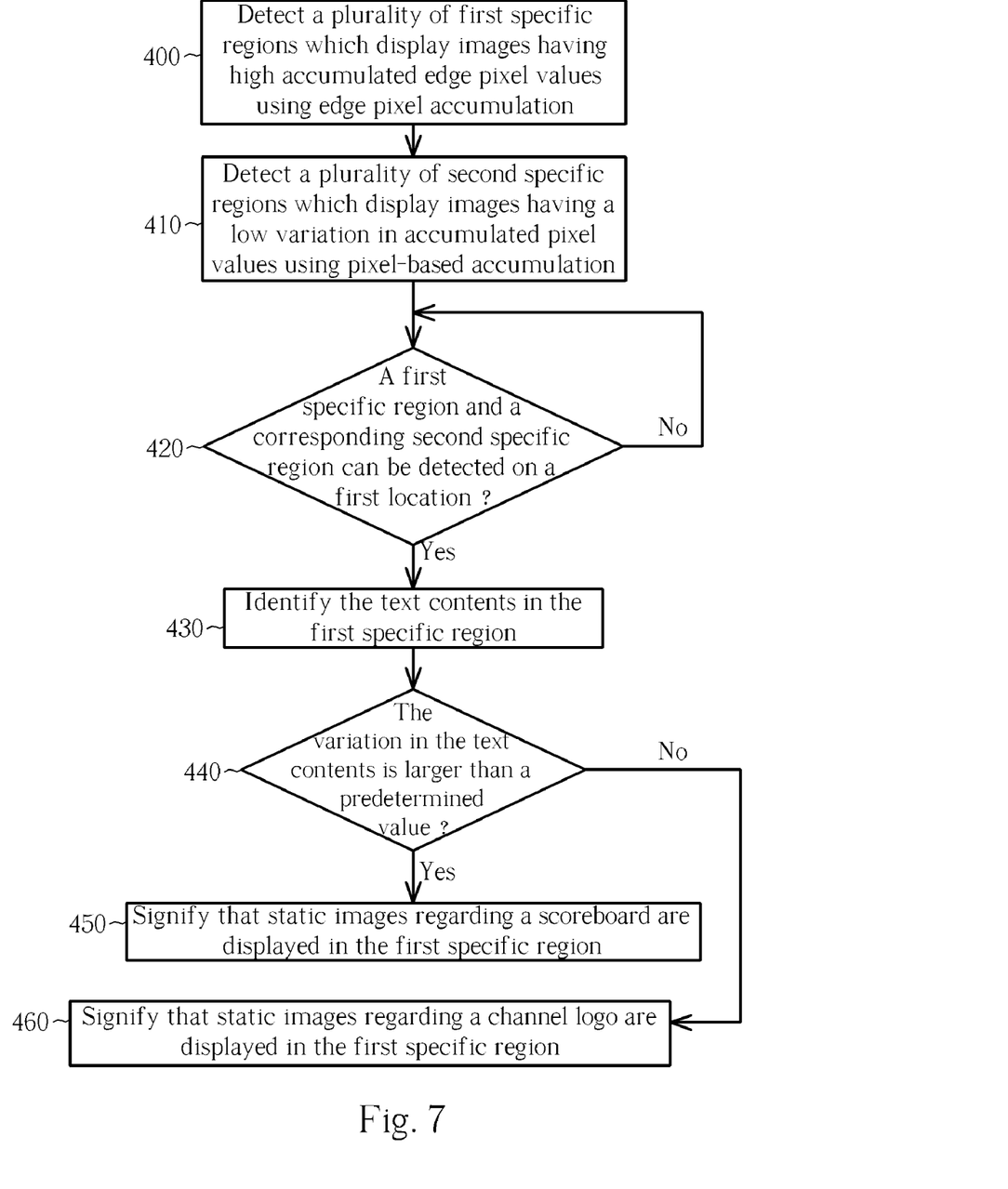
FIG. 7 is a flowchart illustrating a method of detecting a scoreboard in a program according to a fourth embodiment of the present invention.

Reference is made to FIG. 7 for a flowchart illustrating a method of detecting a scoreboard in a program according to a fourth embodiment of the present invention. The flowchart in FIG. 7 includes the following steps:

Step 400: detect a plurality of first specific regions which display images having high accumulated edge pixel values in the frames of the program by means of edge pixel accumulation.

Step 410: detect a plurality of second specific regions which display images having a low variation in accumulated pixel values in the frames of a program by means of pixel-based accumulation.

Step 420: based on a first specific region detected on a first location of the frames of the program, determine whether a corresponding second specific region can be detected on the first location; if the corresponding second specific region can be detected on the first location, execute step 430; if the corresponding second specific region cannot be detected on the first location, execute step 420.

Step 430: identify the text contents in the first specific region.

Step 440: determine whether the variation in the text contents within a predetermined period of time is larger than a predetermined value; if the variation in the text contents is larger than the predetermined value, execute step 450; if the variation in the text contents is not larger than the predetermined value, execute step 460.

Step 450: signify that static images regarding a scoreboard are displayed in the first specific region.

Step 460: signify that static images regarding a channel logo are displayed in the first specific region.

In the fourth embodiment of the present invention, regions displaying statistic images are also detected by means of both pixel-base accumulation and edge pixel accumulation. The fourth embodiment differs from the third embodiment of the present invention in that a plurality of first specific regions which display images having high accumulated edge pixel values are first detected by means of edge pixel accumulation in step 400, and then a plurality of second specific regions which display images having a low variation in accumulated pixel values are detected by means of pixel-based accumulation in step 410. In other words, in addition to detecting the plurality of first specific regions which are likely to display statistic images by means of edge pixel accumulation, the plurality of second specific regions detected by means of pixel-based accumulation in step 410 are used to determine whether each of the first specific region actually displays static images. As a result, the fourth embodiment of the present invention is capable of detecting regions which display static images more accurately.

Figure 8:
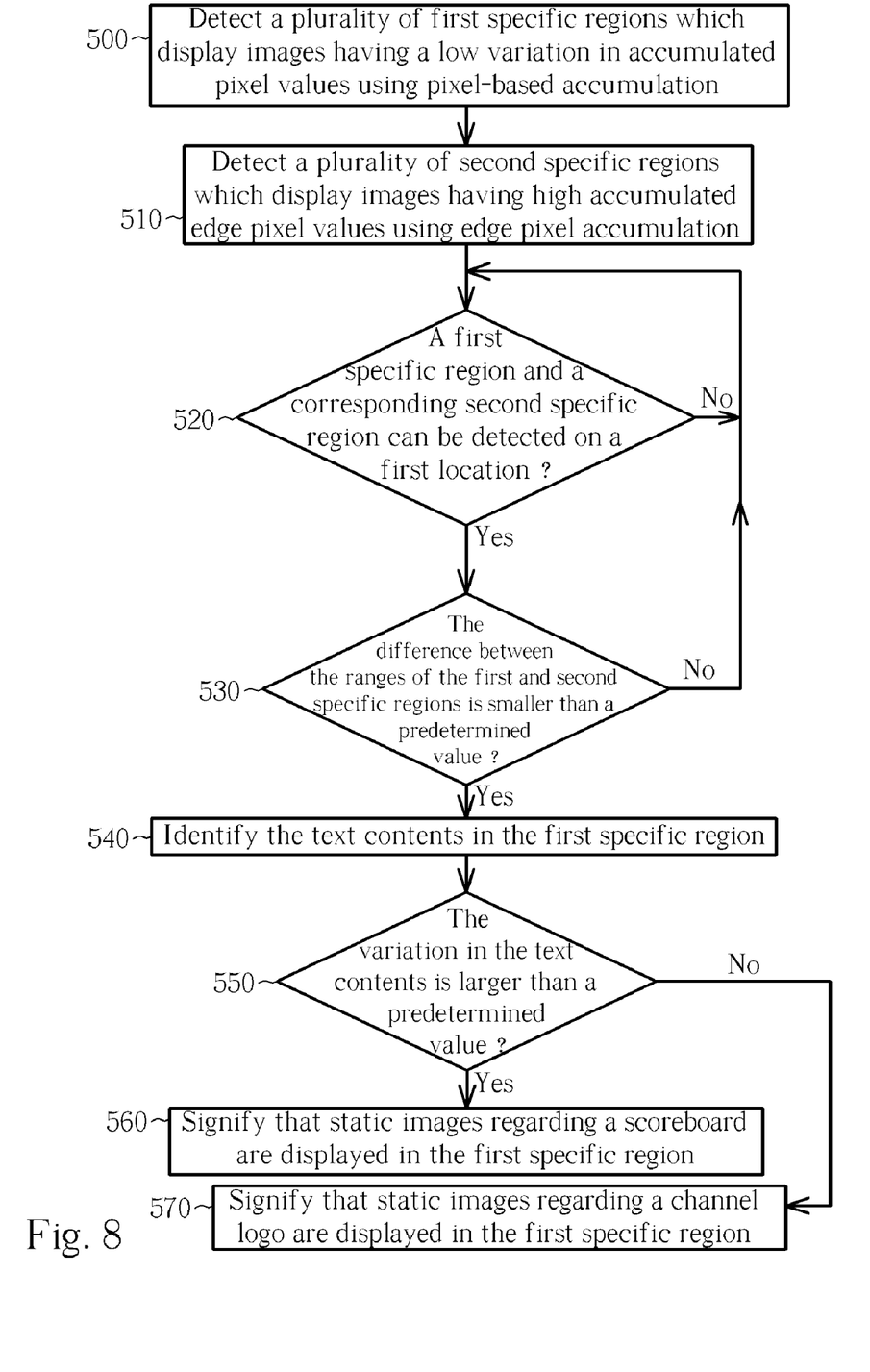
FIG. 8 is a flowchart illustrating a method of detecting a scoreboard in a program according to a fifth embodiment of the present invention.

Reference is made to FIG. 8 for a flowchart illustrating a method of detecting a scoreboard in a program according to a fifth embodiment of the present invention. The flowchart in FIG. 8 includes the following steps:

Step 500: detect a plurality of first specific regions which display images having a low variation in accumulated pixel values in the frames of a program by means of pixel-based accumulation.

Step 510: detect a plurality of second specific regions which display images having high accumulated edge pixel values in the frames of the program by means of edge pixel accumulation.

Step 520: based on a first specific region detected on a first location of the frames of the program, determine whether a corresponding second specific region can be detected on the first location; if the corresponding second specific region can be detected on the first location, execute step 530; if the corresponding second specific region cannot be detected on the first location, execute step 520.

Step 530: determine whether the difference between the ranges of the first and second specific regions is smaller than a first predetermined value; if the difference between the ranges of the first and second specific regions is smaller than the first predetermined value, execute step 550; if the difference between the ranges of the first and second specific regions is not smaller than the first predetermined value, execute step 520.

Step 540: identify the text contents in the first specific region.

Step 550: determine whether the variation in the text contents within a predetermined period of time is larger than a second predetermined value; if the variation in the text contents is larger than the second predetermined value, execute step 560; if the variation in the text contents is not larger than the second predetermined value, execute step 570.

Step 560: signify that static images regarding a scoreboard are displayed in the first specific region.

Step 570: signify that static images regarding a channel logo are displayed in the first specific region.

Similar to the third embodiment of the present invention, regions displaying statistic images are detected by means of both pixel-base accumulation and edge pixel accumulation in the fifth embodiment of the present invention. However, when it is determined in step 520 that the corresponding first and second specific regions can both be detected on the first location, step 530 is further executed in the fifth embodiment of the present invention for determining whether the difference between the ranges of the first and second specific regions is smaller than the first predetermined value. If the ranges of the first and second specific regions differ a lot, the first specific region is not signified as a region displaying statistic images. If the ranges of the first and second specific regions match each other or only differ slightly, the first specific region is signified as a region displaying statistic images, and subsequent steps for identifying/determining text contents are executed. In other words, in addition to detecting the plurality of first and second specific regions which are likely to display statistic images respectively by means of pixel-based accumulation and edge pixel accumulation, the fifth embodiment of the present invention determines whether each of the first specific region displays static images based on the difference between the ranges of the corresponding first and second specific regions. As a result, the fifth embodiment of the present invention is capable of detecting regions which display static images more accurately.

Figure 9:
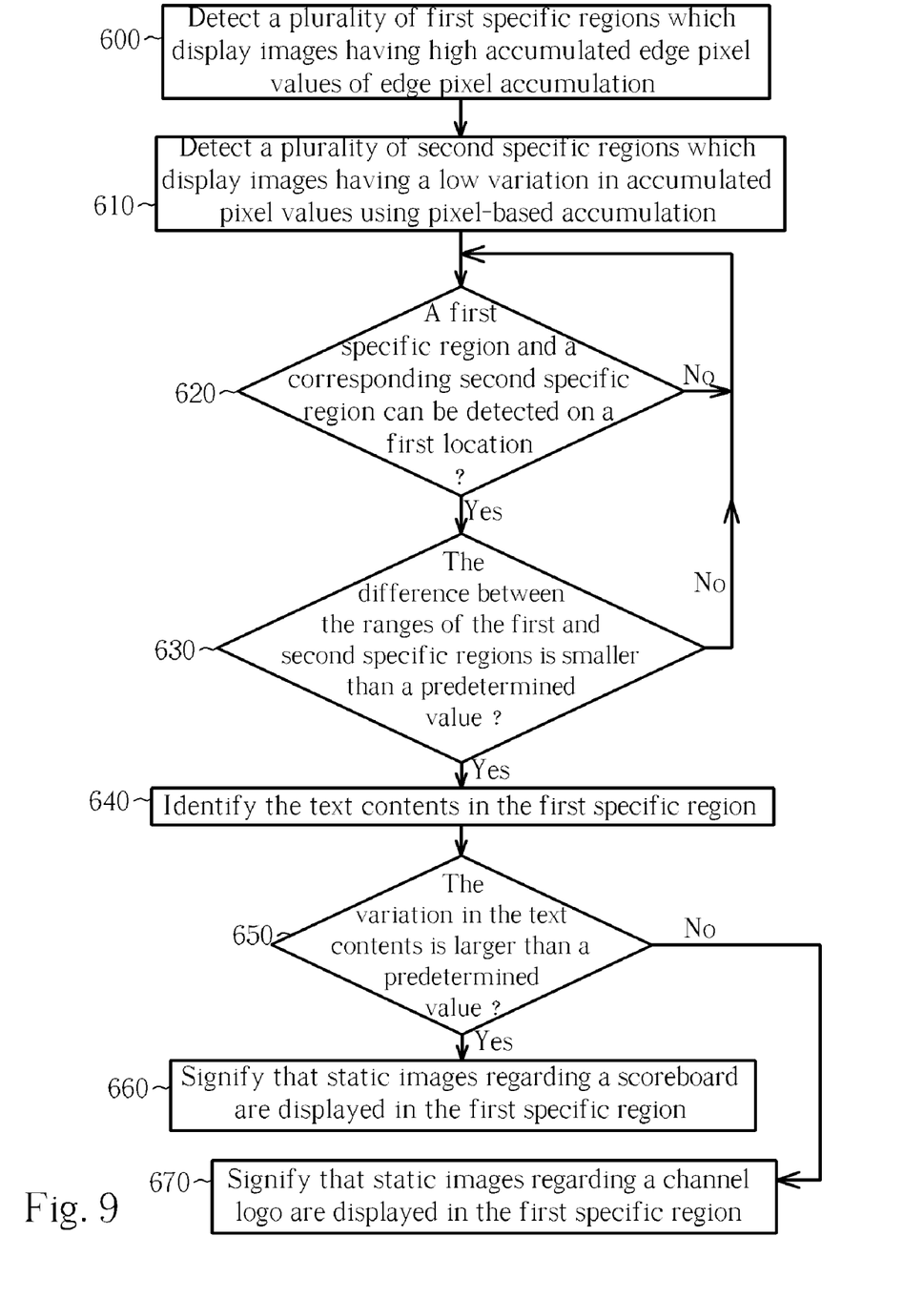
FIG. 9 is a flowchart illustrating a method of detecting a scoreboard in a program according to a sixth embodiment of the present invention.

Reference is made to FIG. 9 for a flowchart illustrating a method of detecting a scoreboard in a program according to a sixth embodiment of the present invention. The flowchart in FIG. 9 includes the following steps:

Step 600: detect a plurality of first specific regions which display images having high accumulated edge pixel values in the frames of the program by means of edge pixel accumulation.

Step 610: detect a plurality of second specific regions which display images having a low variation in accumulated pixel values in the frames of a program by means of pixel-based accumulation.

Step 620: based on a first specific region detected on a first location of the frames of the program, determine whether a corresponding second specific region can be detected on the first location; if the corresponding second specific region can be detected on the first location, execute step 630; if the corresponding second specific region cannot be detected on the first location, execute step 620.

Step 630: determine whether the difference between the ranges of the first and second specific regions is smaller than a first predetermined value; if the difference between the ranges of the first and second specific regions is smaller than the first predetermined value, execute step 650; if the difference between the ranges of the first and second specific regions is not smaller than the first predetermined value, execute step 620.

Step 640: identify the text contents in the first specific region.

Step 650: determine whether the variation in the text contents within a predetermined period of time is larger than a second predetermined value; if the variation in the text contents is larger than the second predetermined value, execute step 660; if the variation in the text contents is not larger than the second predetermined value, execute step 670.

Step 660: signify that static images regarding a scoreboard are displayed in the first specific region.

Step 670: signify that static images regarding a channel logo are displayed in the first specific region.

Similar to the fifth embodiment of the present invention, regions displaying statistic images are also detected by means of both pixel-base accumulation and edge pixel accumulation in the sixth embodiment of the present invention. However, the sixth embodiment differs from the fifth embodiment of the present invention in that a plurality of first specific regions which display images having high accumulated edge pixel values are first detected by means of edge pixel accumulation in step 600, and then a plurality of second specific regions which display images having a low variation in accumulated pixel values are detected by means of pixel-based accumulation in step 610. As a result, the sixth embodiment of the present invention is capable of detecting regions which display static images more accurately.

Figure 10:
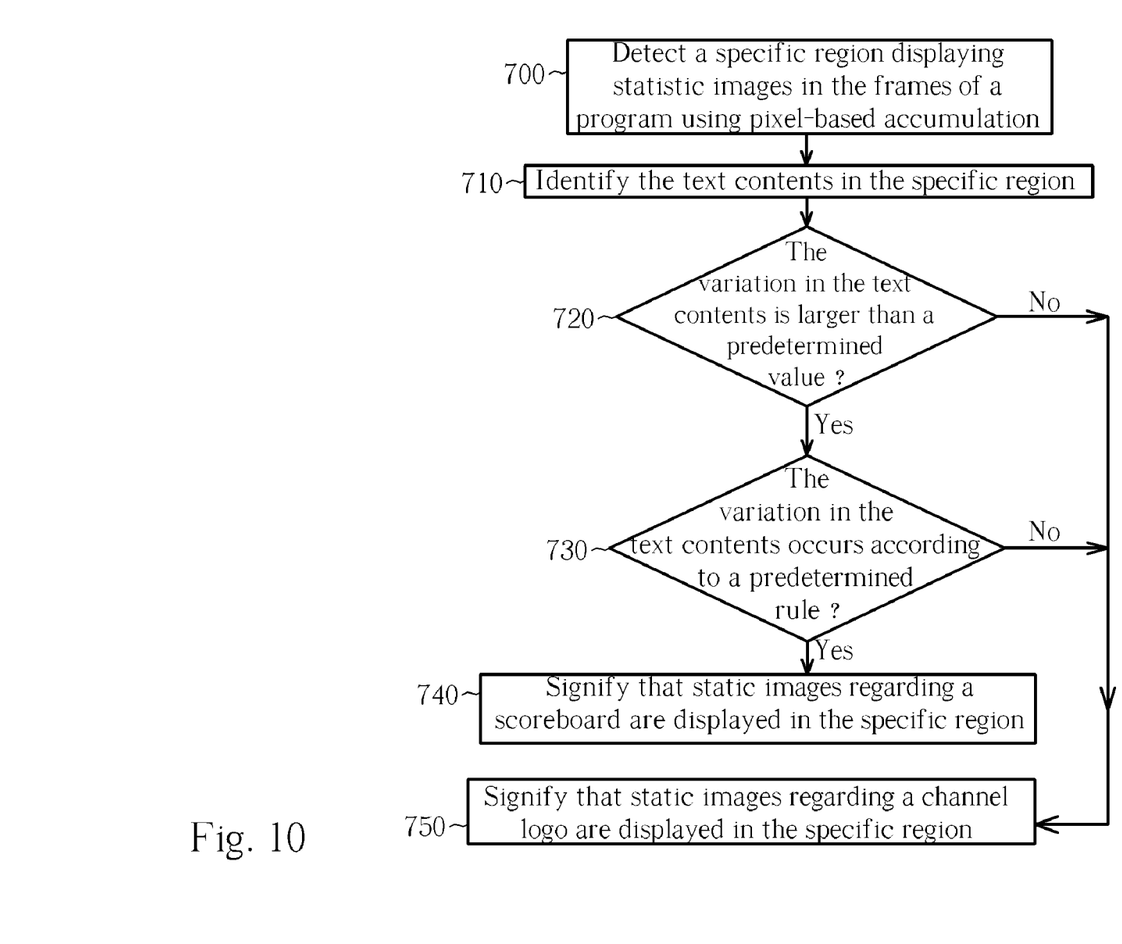
FIG. 10 is a flowchart illustrating a method of detecting a scoreboard in a program according to a seventh embodiment of the present invention.

Reference is made to FIG. 10 for a flowchart illustrating a method of detecting a scoreboard in a program according to a seventh embodiment of the present invention. The flowchart in FIG. 10 includes the following steps:

Step 700: detect a specific region which displays statistic images in the frames of a program by means of pixel-based accumulation.

Step 710: identify the text contents in the specific region.

Step 720: determine whether the variation in the text contents within a predetermined period of time is larger than a predetermined value; if the variation in the text contents is larger than the predetermined value, execute step 730; if the variation in the text contents is not larger than the predetermined value, execute step 750.

Step 730: determine whether the variation in the text contents occurs conforming to a predetermined rule; if the variation in the text contents occurs conforming to the predetermined rule, execute step 740; if the variation in the text contents does not occur according to the predetermined rule, execute step 750.

Step 740: signify that static images regarding a scoreboard are displayed in the specific region.

Step 750: signify that static images regarding a channel logo are displayed in the specific region.

The seventh embodiment is similar to the first embodiment of the present invention. However, when it is determined in step 720 that the variation in the text contents is larger than the predetermined value, step 730 is further executed in the seventh embodiment of the present invention for determining whether the variation in the text contents occurs conforming to the predetermined rule. If the variation in the text contents is larger than the predetermined value and occurs conforming to the predetermined rule, step 740 is executed for signifying that static images regarding a scoreboard are displayed in the specific region. If the variation in the text contents is not larger than the predetermined value, or the variation in the text contents is larger than the predetermined value but does not occur according to the predetermined rule, step 750 is executed for signifying that static images regarding a channel logo are displayed in the specific region.

Figure 11:
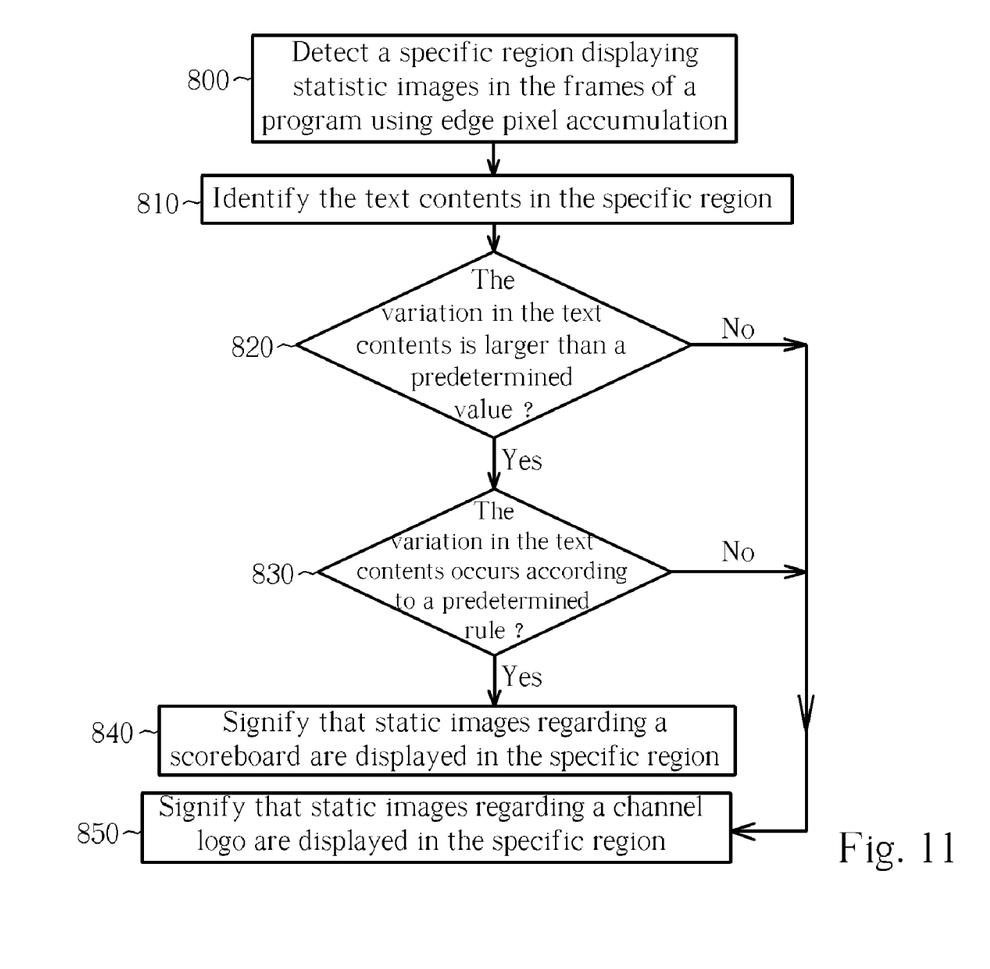
FIG. 11 is a flowchart illustrating a method of detecting a scoreboard in a program according to an eighth embodiment of the present invention.

Reference is made to FIG. 11 for a flowchart illustrating a method of detecting a scoreboard in a program according to an eighth embodiment of the present invention. The flowchart in FIG. 11 includes the following steps:

Step 800: detect a specific region displaying statistic images in the frames of a program by means of edge pixel accumulation.

Step 810: identify the text contents in the specific region.

Step 820: determine whether the variation in the text contents within a predetermined period of time is larger than a predetermined value; if the variation in the text contents is larger than the predetermined value, execute step 830; if the variation in the text contents is not larger than the predetermined value, execute step 850.

Step 830: determine whether the variation in the text contents occurs conforming to a predetermined rule; if the variation in the text contents occurs conforming to the predetermined rule, execute step 840; if the variation in the text contents does not occur according to the predetermined rule, execute step 850.

Step 840: signify that static images regarding a scoreboard are displayed in the specific region.

Step 850: signify that static images regarding a channel logo are displayed in the specific region.

The eighth embodiment is similar to the seventh embodiment of the present invention. However, the eighth embodiment differs from the seventh embodiment of the present invention in that a specific region displaying statistic images is detected by means of edge pixel accumulation in step 800. When it is determined in step 820 that the variation in the text contents is larger than the predetermined value, step 830 is also executed in the eighth embodiment of the present invention for determining whether the variation in the text contents occurs conforming to the predetermined rule. If the variation in the text contents is larger than the predetermined value and occurs conforming to the predetermined rule, step 840 is executed for signifying that static images regarding a scoreboard are displayed in the specific region. If the variation in the text contents is not larger than the predetermined value, or the variation in the text contents is larger than the predetermined value but does not occur according to the predetermined rule, step 850 is executed for signifying that static images regarding a channel logo are displayed in the specific region. In the eighth embodiment of the present invention, the predetermined rule can be set according to the type of the program.

Figure 12:
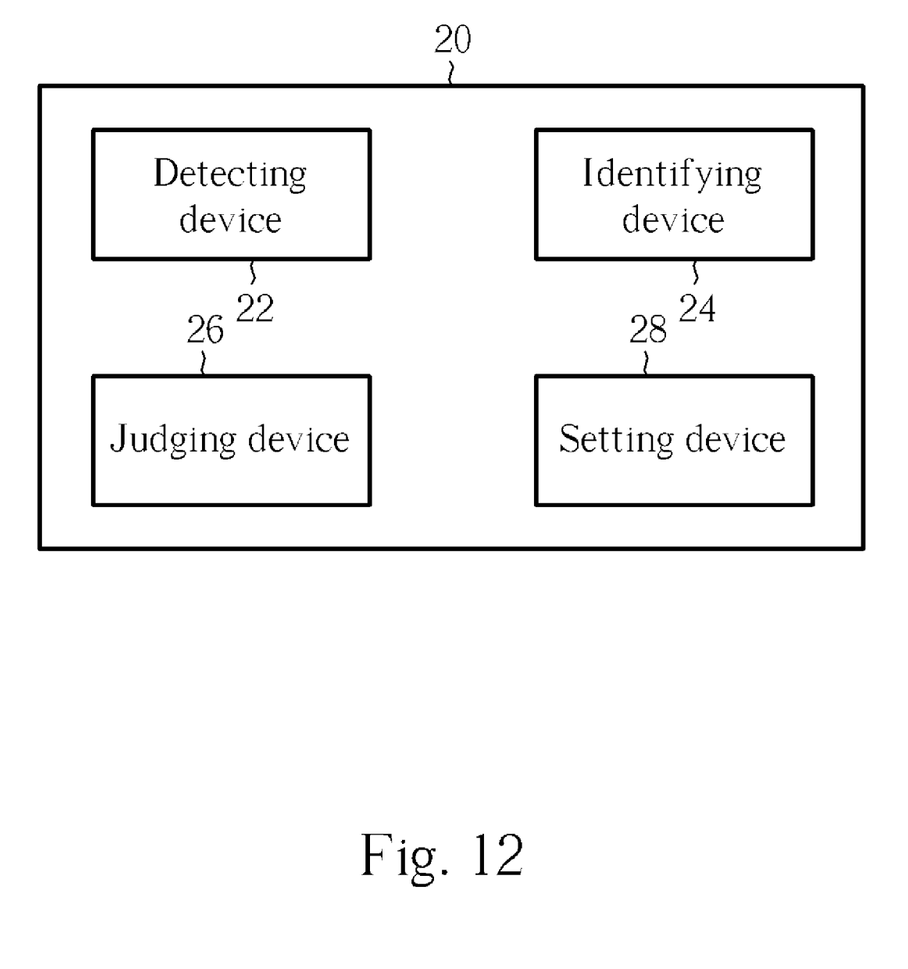
FIG. 12 is a functional diagram illustrating a display system capable of detecting a scoreboard in a program.

Reference is made to FIG. 12 for a functional diagram illustrating a display system 20 capable of detecting a scoreboard in a program. The display system 20 includes a detecting device 22, an identifying device 24, a judging device 26, and a setting device 28. The detecting device 22 is capable of detecting a region displaying static images in a program having a plurality of frames. The identifying device 24 is capable of identifying text contents in the region which displays static images. The judging device 26 is capable of determining whether the variation in the text contents is larger than a predetermined value and occurs conforming to a predetermined rule. When the text contents is larger than the predetermined value and occurs conforming to the predetermined rule, the judging device 28 signifies that the region displays the static images regarding a scoreboard. The setting device is capable of setting the predetermined value and the predetermined rule based on the type of the program.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of using a display system for
detecting a scoreboard in a program comprising:
detecting with a detecting device a region which displays static images in a program having a plurality of frames;
identifying with an identifying device text contents in the region;
determining with a judging device whether a variation in the text contents is larger than a first predetermined value; and
signifying with the judging device that the region displays the static images regarding a scoreboard when the variation in the text contents is larger than the first predetermined value.

2. The method of claim 1 further comprising:
signifying with the judging device that the region displays the static images regarding a channel logo when the variation in the text contents is not larger than the first predetermined value.

3. The method of claim 1 further comprising:
determining with the judging device whether the variation in the text contents occurs conforming to a predetermined rule when the variation in the text contents is larger than the first predetermined value; and signifying with the judging device that the region displays the static images regarding a scoreboard when the variation in the text contents occurs conforming to the predetermined rule.

4. The method of claim 3 further comprising:

signifying with the judging device that the region displays the static images regarding a channel logo when the variation in the text contents does not occur conforming to the predetermined rule.

5. The method of claim 3 further comprising:

setting with a setting device the predetermined rule based on a type of the program.

6. The method of claim 1 further comprising:

accumulating pixel values of images displayed in the plurality of frames within a predetermined period of time for generating pixel accumulation signals corresponding to each location in the frames; and determining with the judging device a range of the region based on the pixel accumulation signals corresponding to each location in the frames.

7. The method of claim 6 further comprising:

among the pixel accumulation signals corresponding to all locations in the frames, signifying with the judging device that the pixel accumulation signals having a relative low brightness comprise the range of the region.

8. The method of claim 6 further comprising:

performing image inversion on the pixel accumulation signals corresponding to all locations in the frames for generating a plurality of corresponding inverted pixel accumulation signals; and among the inverted pixel accumulation signals corresponding to all locations in the frames, signifying with the judging device that the inverted pixel accumulation signals having a relative high brightness comprise the range of the region.

9. The method of claim 1 further comprising:

performing edge detection with the detecting device on each frame for generating edge pixel values corresponding to each location in each frame;

accumulating the edge pixel values corresponding to each frame within a predetermined period of time for generating accumulated edge pixel values corresponding to each location in the frames; and determining with the judging device a range of the region based on the accumulated edge pixel values corresponding to each location in the frames.

10. The method of claim 9 further comprising:

among the accumulated edge pixel values corresponding to all locations in the frames, signifying with the judging device that locations having accumulated edge pixel values of a relative high brightness comprise the range of the region.

11. The method of claim 1 further comprising:

detecting with the detecting device a plurality of first regions which display images having a low variation in accumulated pixel values in the frames of the program by means of pixel-based accumulation;

detecting with the detecting device a plurality of second regions which display images having a high accumulated edge pixel values in the frames of the program by means of edge detection;

based on a first region detected on a first location of the frames of the program, determining with the judging device whether a corresponding second region can be detected on the first location; and signifying with the judging device that the first region is the region which displays the static images when the corresponding second region can be detected on the first location.

12. The method of claim 11 further comprising:

determining with the judging device whether a variation in ranges of the first and second regions is smaller than a second predetermined value when the corresponding second region can be detected on the first location; and signifying with the judging device that the first region is the region displaying the static images when the variation in the ranges of the first and second regions is smaller than the second predetermined value.

13. The method of claim 1 further comprising:

detecting with the detecting device a plurality of first regions which displays images having a high accumulated edge pixel values in the frames of the program by means of edge detection;

detecting with the detecting device a plurality of second regions which displays images having a low variation in accumulated pixel values in the frames of the program by means of pixel-based accumulation;

based on a first region detected on a first location of the frames of the program, determining with the judging device whether a corresponding second region can be detected on the first location; and signifying with the judging device that the first region is the region which displays the static images when the corresponding second region can be detected on the first location.

14. The method of claim 13 further comprising:

determining with the judging device whether a variation in ranges of the first and second regions is smaller than a second predetermined value when the corresponding second region can be detected on the first location; and signifying with the judging device that the first region is the region which displays the static images when the variation in the ranges of the first and second regions is smaller than the second predetermined value.

15. The method of claim 1 wherein the static images comprise a channel logo or a scoreboard.

16. The method of claim 1 wherein identifying the text contents in the region comprises identifying a symbol or a number in the region.

17. The method of claim 1 further comprising:

setting with a setting device the first predetermined value based on a type of the program.

18. A display system capable for detecting a scoreboard in a program comprising:

a detecting means detecting a region which displays static images in a program having a plurality of frames;

an identifying means identifying text contents in the region; and a judging means determining whether a variation in the text contents is larger than a predetermined value and occurs conforming to a predetermined rule, the judging means signifying that the region displays the static images regarding a scoreboard when the variation in the text contents is larger than the predetermined value and occurs conforming to the predetermined rule.

19. The display system of claim 18 further comprising:

a setting means setting the predetermined value and the predetermined rule based on a type of the program.

* * * * *